(12) United States Patent
Zarenin et al.

(10) Patent No.: US 7,640,546 B2
(45) Date of Patent: Dec. 29, 2009

(54) METHOD AND SYSTEM FOR IDENTIFYING ACTIVE DEVICES ON NETWORK

(75) Inventors: Alex Zarenin, Montclair, NJ (US); Anatoliy Belugin, New Windsor, NY (US)

(73) Assignee: Barclays Capital Inc., New York, NY (US)

( * ) Notice: Subject to any disclaimer, the term of this patent is extended or adjusted under 35 U.S.C. 154(b) by 911 days.

(21) Appl. No.: 10/759,901

(22) Filed: Jan. 16, 2004

(65) Prior Publication Data

US 2008/0189405 A1    Aug. 7, 2008

(51) Int. Cl.
*G06F 9/46* (2006.01)
*G06F 15/16* (2006.01)
*G06F 15/173* (2006.01)

(52) U.S. Cl. .................. 718/102; 719/316; 719/317; 709/201; 709/223; 709/224

(58) Field of Classification Search ......... 718/100–102; 709/201–203, 223–226; 719/316, 317
See application file for complete search history.

(56) References Cited

U.S. PATENT DOCUMENTS

| | | | | |
|---|---|---|---|---|
| 6,119,159 A * | 9/2000 | Tseng et al. | ................. | 709/224 |
| 6,308,205 B1 * | 10/2001 | Carcerano et al. | ........... | 709/221 |
| 6,430,596 B1 * | 8/2002 | Day, II | ........................ | 709/202 |
| 6,434,626 B1 * | 8/2002 | Prakash et al. | .............. | 709/238 |
| 6,549,932 B1 * | 4/2003 | McNally et al. | ............. | 709/202 |
| 6,574,664 B1 * | 6/2003 | Liu et al. | .................... | 709/224 |
| 6,760,750 B1 * | 7/2004 | Boneh et al. | ................ | 709/204 |
| 6,834,303 B1 * | 12/2004 | Garg et al. | .................... | 709/224 |
| 7,069,325 B1 * | 6/2006 | Lu et al. | ..................... | 709/226 |
| 7,174,379 B2 * | 2/2007 | Agarwal et al. | ............. | 709/226 |
| 7,213,068 B1 * | 5/2007 | Kohli et al. | .................. | 709/225 |
| 7,222,148 B2 * | 5/2007 | Potter et al. | ................. | 709/201 |
| 7,376,728 B1 * | 5/2008 | Motoyama et al. | .......... | 709/224 |
| 2001/0027349 A1 * | 10/2001 | Eady et al. | .................... | 700/17 |
| 2002/0004824 A1 * | 1/2002 | Cuan et al. | ................... | 709/208 |
| 2002/0055967 A1 * | 5/2002 | Coussement | ................ | 709/202 |
| 2002/0165952 A1 * | 11/2002 | Sewell et al. | ................ | 709/224 |
| 2003/0028642 A1 * | 2/2003 | Agarwal et al. | ............. | 709/226 |
| 2003/0097425 A1 * | 5/2003 | Chen | .......................... | 709/220 |
| 2004/0003058 A1 * | 1/2004 | Trossen | ..................... | 709/220 |
| 2004/0122944 A1 * | 6/2004 | Poirot et al. | ................ | 709/224 |

* cited by examiner

*Primary Examiner*—Lewis A Bullock, Jr.
*Assistant Examiner*—Jennifer N To
(74) *Attorney, Agent, or Firm*—Morgan, Lewis & Bockius LLP

(57) ABSTRACT

Active devices on a network are identified by simultaneously issuing to a plurality of worker threads a request for information identifying the devices. The worker threads are capable of performing identical functions in response to the request for information. Based on device architecture information provided in response to the request for information, a plurality of customized scripts are identified and executed, which request additional information about the device.

3 Claims, 13 Drawing Sheets

```
Const oid_name_str = "system.sysName.0"
Dim NetBiosName
Dim St

If Collector.CallCount=1 Then '// First Call --  !
    Collector.OID = oid_name_str
    Collector.Continue OpGet
Else
    If Success Then
        NetBiosName = Collector.Value
        If Len (NetBiosName) =0 Then
            NetBiosName=Collector.DNSName
            If Len (NetBiosName) =0 Then
                Collector.Abort "" & Collector.TargetIP & " No Name available"
                Exit Function
            End If
        End If
        St=InStr (NetBiosName," .")
        If St Then
            NetBiosName=Left (NetBiosName,St-1)
        End If
        Collector.DDRName = Replace (NetBiosName," "," ")
        Collector.DDRAddString "Netbios Name", NetBiosName, 32, ADDPROP_NAME Or ADDPROP_KEY
        Collector.Continue OpDone
    Else
        Collector.Abort "" & Collector.TargetIP & " No Name available"
    End If
End If
```

```
Network Discovery (NWCHSWBB1320)\Architecture\SystemName

Const oid_name_str = "system.sysName.0"
Dim NetBiosName
Dim St

If Collector.CallCount=1 Then '// First Call -- !
    Collector.OID = oid_name_str
    Collector.Continue OpGet
Else
    If Success Then
        NetBiosName = Collector.StringValue
        If Len (NetBiosName) =0 Then
            NetBiosName=Collector.DNSName
            If Len (NetBiosName) =0 Then
                Collector.Abort "" & Collector.TargetIP & " No Name
                Exit Function
            End If
        End If
        St=InStr (NetBiosName,".")
        If St Then
            NetBiosName=Left (NetBiosName,St-1)
        End If
        Collector.DDRName = Replace (NetBiosName," ","_")
        Collector.DDRAddString "Netbios Name", NetBiosName, 32, ADDPROP_N
        Collector.Continue OpDone
    Else
        Collector.Abort "" & Collector.TargetIP & " No Name available"
    End If
End If
```

Categories:
- Network Discovery (NUCHGWBB1320)
  - Discovery Sites
  - Schedule
  - SNMP OID Mapping
  - Architectures
    - Print
    - System
      - Name
      - Domain Name
      - Operating System
      - System Roles
      - IP & Subnet Info
      - MAC Address
      - SoftwareList
      - Hardware List

10/27/2003  3:50 PM

METHOD AND SYSTEM FOR IDENTIFYING ACTIVE DEVICES ON NETWORK

FIELD OF THE INVENTION

The present invention relates to identifying active devices on a network.

BACKGROUND OF THE INVENTION

The principal benefit of corporate networks today is in interconnecting a multitude of network resources to provide the backbone for various means of communication within and outside the corporation. Today's networks span multiple locations, geographic regions, continents, and time zones, and interconnect thousands of devices. Due to the sheer number of devices present on the network, the networks are very dynamic—devices are added, moved, and removed from the network to address the current needs of the corporation. When the networks are laid out initially, the distribution of various network devices is well-known. However, over time, due to the dynamic nature of corporate networks, knowledge regarding the location of various network devices erodes. At that time, the need arises to "walk" the network and "re-discover" components attached to it together with their location and interconnection information, which allows for restoring network topology and provides information for network analysis and optimization.

At the same time, the majority of corporate technical assets are deployed on corporate networks. As these assets are allocated and reallocated to different areas, groups, and individuals, it becomes very difficult to keep proper track of these allocations for financial accounting purposes. Timely and accurate information regarding deployment of various network assets is crucial for accurate accounting and asset tracking functions. These asset tracking needs are exacerbated in the case of a disaster. If a disaster results in loss of network assets, information regarding the most recent (ultimately—for the moment of the disaster) allocation of these assets becomes crucial for controlling the damage. Timely network discovery and storage of discovered information in appropriate historical databases addresses these issues.

As technological innovations bring new features (like serial numbers burned into central processing units (CPUs), printers, and monitors) into existing devices as well as completely new types of devices (such as internet protocol (IP)-based telephones), network discovery needs may change. Instead of simply identifying a device on the network, there may be an interest in collecting some additional, presently-unforeseen information about the discovered device. This ever-changing environment requires flexible, easily-reconfigurable and easily-adaptable discovery solutions.

Typically, network discovery is implemented as various forms of exhaustive network sweeps. There are some other approaches based upon querying some auxiliary databases (Doman Name System (DNS), Windows Internet Naming Service (WINS), Dynamic Host Configuration Protocol (DHCP), etc.) to get network addresses of registered devices. However, all these approaches rely on the devices registering themselves in one of those auxiliary databases, which may not occur for all of the devices. Thus, the most authoritative and reliable way for implementing network discovery remains the complete network sweep.

In connection with a complete network sweep, every address in the address space of the network is "touched" to verify the presence or absence of a device at that address. If a device is found at some network address, further queries are directed to this address to collect the required level of information for proper identification of the discovered asset. For the ease of management, networks are typically designed as sparse, such that the address space on the network is typically 10 to 100 times the number of devices actually connected to the network. Thus, to discover thousands of devices on a network, a discovery mechanism typically must touch hundreds of thousands of potential addresses.

This problem is further exacerbated by the nature of the Transmission Control Protocol/Internet Protocol (TCP-IP) protocol ubiquitous on today's networks. According to the transport level specification of the TCP-IP protocol, a communication between two points on the network is considered failed if an expected response was not received within a certain timeout period. Due to the random nature of signal propagation on TCP-IP networks, the timeout value is typically much larger then the average round-trip time for a message. Thus, to verify an absence of a device on a particular address in the address space of the network, a discovery agent should send a request and then wait until the expiration of the timeout interval. To improve the reliability of this process in case of a timeout, a discovery agent typically repeats the request 2-3 times, thereby further slowing the discovery process.

Similarly, when a device is discovered on the network, a discovery agent must try various protocols (like Simple Network Management Protocol (SNMP) with different community names, Hypertext Transfer Protocol (HTTP) on different ports, etc.) as the agent does not know ahead of time the nature of the discovered device and on what protocol with which parameters the device will reply. Again, to confirm the failure of a particular protocol, a discovery agent has to wait throughout the timeout interval and then repeat its attempt several times.

Due to the aforementioned problems, typical network discovery solutions are very slow. Existing network management software products (such as HP OPENVIEW, etc.) would take several days or even weeks to perform an exhaustive sweep of the network. Due to the dynamic nature of networks, discovery data achieved through these processes will be outdated by the time it is collected.

SUMMARY OF THE INVENTION

The present invention is directed to a method for identifying a plurality of active devices on a network. A request for information is simultaneously issued to the plurality of active devices, by each of a plurality of worker threads. The information includes an indication of a presence of the active device on the network, wherein all of the plurality of worker threads are capable of performing identical functions in response to the request for information. In response to the request, the information is received. The received information is stored.

The present invention is also directed to a machine-readable medium that includes instructions for discovering active devices on a network. The instructions, when executed by a computer, cause the computer to simultaneously issue to the plurality of active devices, by each of a plurality of worker threads, a request for information. The information includes an indication of a presence of the active device on the network. All of the plurality of worker threads are capable of performing identical functions in response to the request for information. The instructions also cause the computer to receive, in response to the request, the information and store the received information.

The present invention is further directed to a computer system for identifying a plurality of active devices on a network. The computer system includes a computer that processes (1) a plurality of request objects each comprising a representation of one of the active devices and a request for information about the active device; and (2) a manager object comprising a plurality of worker threads. The manager object (a) receives each of the plurality of request objects; (b) organizes each of the received request objects into a request queue; (c) distributes each of the received request objects in the request queue to one of the plurality of worker threads, wherein all of the plurality of worker threads are capable of performing identical functions in response to the request for information; (d) receives asynchronously from each of the plurality of worker threads the request object after the request for information has been fullfilled; and (e) organizes each of the received request objects after the request for information has been fulfilled into a result queue. The system further includes a storage device coupled to the computer.

The present invention is also directed to a method for identifying a plurality of active devices on a network. A program is executed, which includes (1) issuing to each of the active devices one or more first requests for information comprising an indication of a presence of the device on the network and a device architecture; and (2) receiving in response to the first requests a response. Based on the device architecture indicated in the response, one or more scripts that request additional information about the device are identified. The scripts are customizable and executed outside the program. The scripts are executed and the additional information is received.

The present invention is further directed to a machine-readable medium that includes instructions for discovering active devices on a network, wherein such instructions, when executed by a computer, cause the computer to execute a program comprising (1) issuing to each of the active devices one or more first requests for information comprising an indication of a presence of the device on the network and a device architecture; and (2) receiving in response to the first requests a response. In addition, the instructions cause the computer to identify, based on the device architecture indicated in the response, one or more scripts that request additional information about the device, wherein the scripts are customizable and executed outside the program. The instructions also cause the computer to execute the scripts and receive the additional information.

Finally, the present invention is directed to a computer system for identifying a plurality of active devices on a network. The computer system includes a computer, in communication with the network, that executes a program comprising (1) issuing to each of the active devices one or more first requests for information comprising an indication of a presence of the device on the network and a device architecture; and (2) receiving in response to the first requests a response. The computer identifies, based on the device architecture indicated in the response, one or more scripts that request additional information about the device. The scripts are customizable and executed outside the program. The computer executes the scripts and receives the additional information. The computer system also includes a storage device coupled to the computer that stores the response and the additional information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings:

FIG. 6 is an exemplary script that may be executed in connection with carrying out the preferred embodiment of the methods of the present invention.

FIGS. 7-11 illustrate exemplary interfaces that may be used in connection with the present invention.

DETAILED DESCRIPTION OF THE PREFERRED EMBODIMENTS

The present invention provides a programmatic network discovery tool capable of carrying out exhaustive network discovery significantly faster (orders of magnitude) than existing tools to achieve real or semi-real time identification of allocated network assets. The network discovery tool of the present invention can be easily adapted to ever-changing discovery requirements through a flexible, yet comprehensive, mechanism for reconfiguring the discovery process without sacrificing the speed with which network discovery is accomplished. A user-friendly and comprehensive management interface is provided, which allows for compartmentalized and structured, yet flexible, management of all aspects of network discovery.

Figure 1:
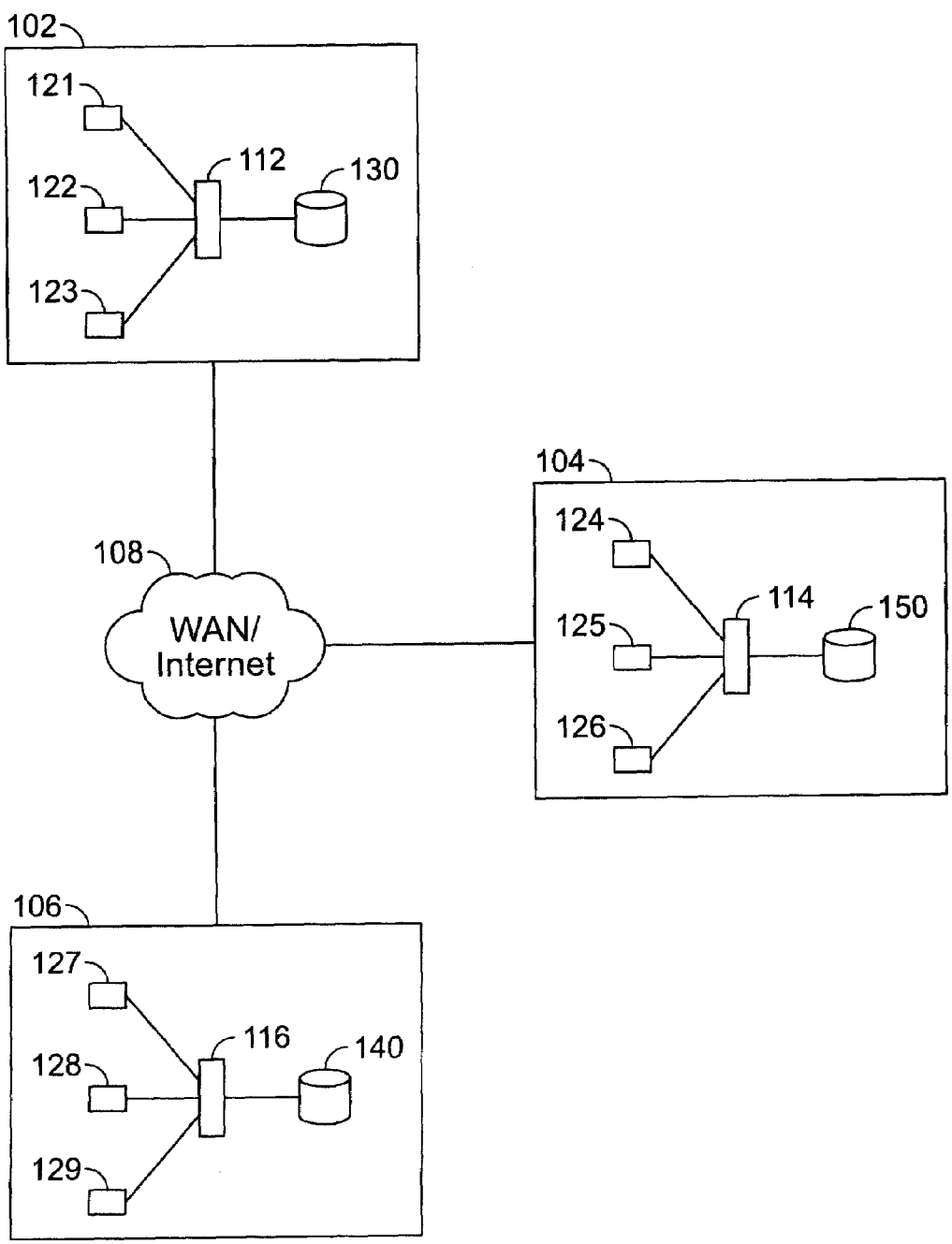
FIG. 1 is an exemplary network within which the present invention can be implemented.

FIG. 1 illustrates an exemplary network on which the present invention can be implemented. The network may comprise a single site 102, or multiple sites 102, 104, 106. Each site 102, 104, 106 may have multiple network resources such as servers 112, 114, 116, and other devices 121, 122, 123, 124, 125, 126, 127, 128, 129 to be discovered. Such devices may be personal computers (PCs), printers, servers, and/or IP-telephones, by way of example. Databases 130, 140, 150 may also be provided for storing data generated in accordance with the present invention. Alternatively, such data may be stored in servers 112, 114, 116 or on PCs, e.g., device 121. Devices at a single site 102 may be connected over a Local Area Network (LAN). In the multi-site embodiment, the devices may be connected via a Wide Area Network (WAN) or the Internet 108. While FIG. 1 illustrates only a minimal number of network devices, the present invention is usable on a network with any number of devices.

Distributed network resources are tracked and inventoried in accordance with the present invention. In particular, the system and process of the present invention discovers, identifies, and classifies distributed active network resources, as well as collects additional information about the resources using standard IP protocols, such as Internet Control Message Protocol (ICMP), SNMP, HTTP, under the control of custom scripts. A heavily multithreaded agent reaches out to sweep the network discovering active devices using ICMP. Discovered devices are queried for additional information, as specified in the custom scripts, using a combination of SNMP and HTTP protocols. The scripts are exposed to a powerful yet flexible discovery and logging framework while insulating them of the intricacies of the highly efficient discovery process. The information returned through the discovery process is sufficient for proper identification and registration of the discovered devices in a database. Results of the discovery are presented for further processing in the form of industry-standard Extensible Markup Language (XML) files, in the preferred embodiment, although other formats can be used. Agent operations are controlled through a user interface specifically designed to address the needs of network discovery under a variety of requirements. The user interface presents all aspects of managing network discovery using the present invention in a highly-structured, comprehensive way, which allows for direct navigation to the appropriate aspects of the management infrastructure.

The inventive discovery process may operate either interactively or completely autonomously as a scheduled service. In addition to the actual discovery results, a comprehensive and configurable set of log files are generated as a result of the inventive process. Thus, complete discovery statistics are provided, which allows for quick identification and resolution of discovery exceptions.

As discussed in the Background, prior art network discovery solutions waste a great deal of time waiting for network requests to time out. This wait period generally is much longer than the actual time required for transmitting requested data over the network if the connection is successfully established. During this wait period, the process requesting the operation is inactive, consuming practically no CPU time and very little memory on the system running the discovery process. The present invention resolves this problem by compressing more requests into the same time frame, which is achieved by creating a pool of internal worker threads that operate in parallel, sharing the time that is otherwise, wastefully, spent waiting.

The worker thread pool is configurable at run-time and can be extended to about 2,000 individual threads, in the preferred embodiment. The optimal number of individual threads can vary within the scope of the present invention and is dependant on a number of factors, including the operating system architecture, the power of the computer running the program, including the number of CPUs in the computer and the amount of available memory, and the speed of network connectivity. All the worker threads in the pool are identical and interchangeable, meaning that all of the threads are capable of handling all requests in a particular request queue (discussed in more detail with respect to FIGS. 2, 3, and 4) and performing identical functions with regard to each request. This optimizes resource utilization and speeds up the discovery process on an order proportional to the number of worker threads in the pool.

Certain basic discovery operations, such as processing network definitions, generating a list of addresses in the network's address space, and evaluating the presence of devices at these addresses, are hard-coded into the discovery agent, as these are the operations that are implemented independently of the specific tasks of the network discovery. In addition, using a custom list of SNMP object identifiers (OIDs) and other preprogrammed mechanisms, the architecture of the devices discovered on the network is determined. The architecture for a given device is used to select the set of custom scripts that define specific discovery functions appropriate for devices of this architecture. Internal collector objects (described in more detail with reference to FIG. 5) allow for writing flexible discovery scripts without delving in to the minute details of discovery implementation. Through the collector object, the scripts are completely insulated from the intricacies of the multithreading, asynchronous execution, and error processing and focus on retrieving discovery data in a simplified, linear manner.

The embodiment described herein relates to scripts that address discovery needs related to PCs and printers. However, in accordance with the present invention, architectures can be defined and scripts appropriate for these architectures can be provided to address discovery of any SNMP or HTTP enabled devices. The operations requested by the scripts are scheduled to the worker thread pool in the same manner (and with the same efficiency) as the base discovery operations implemented directly in the discovery agent.

Discovery results are provided as an industry-standard XML file, in the preferred embodiment (or in other formats in other embodiments), which may be directly imported into other third-party products or databases.

Operation of the discovery agent is controlled through a convenient and user-friendly graphical interface. Parameters defining discovery, including subnet information, identification of various architectures, scheduling of discovery runs, level of logging, etc. are defined through the inventive interface. Interactive or autonomous execution of the inventive process may also be invoked through the interface. The interface also provides for management of the custom scripts, which are tightly integrated with the discovery process and govern the discovery subtasks performed by the inventive system and process. Changing existing scripts and/or creating and imbedding into the discovery process new scripts does not require changes, recompilation, or link-editing of any executables—all the modifications are carried out through the interface. The functions performed by interface may run locally (on the machine where inventive system is installed and running, such as device 121 or server 112 of FIG. 1) or remotely over a network.

A more detailed description of the invention will now be provided with reference to FIGS. 2 through 11.

Figure 2:
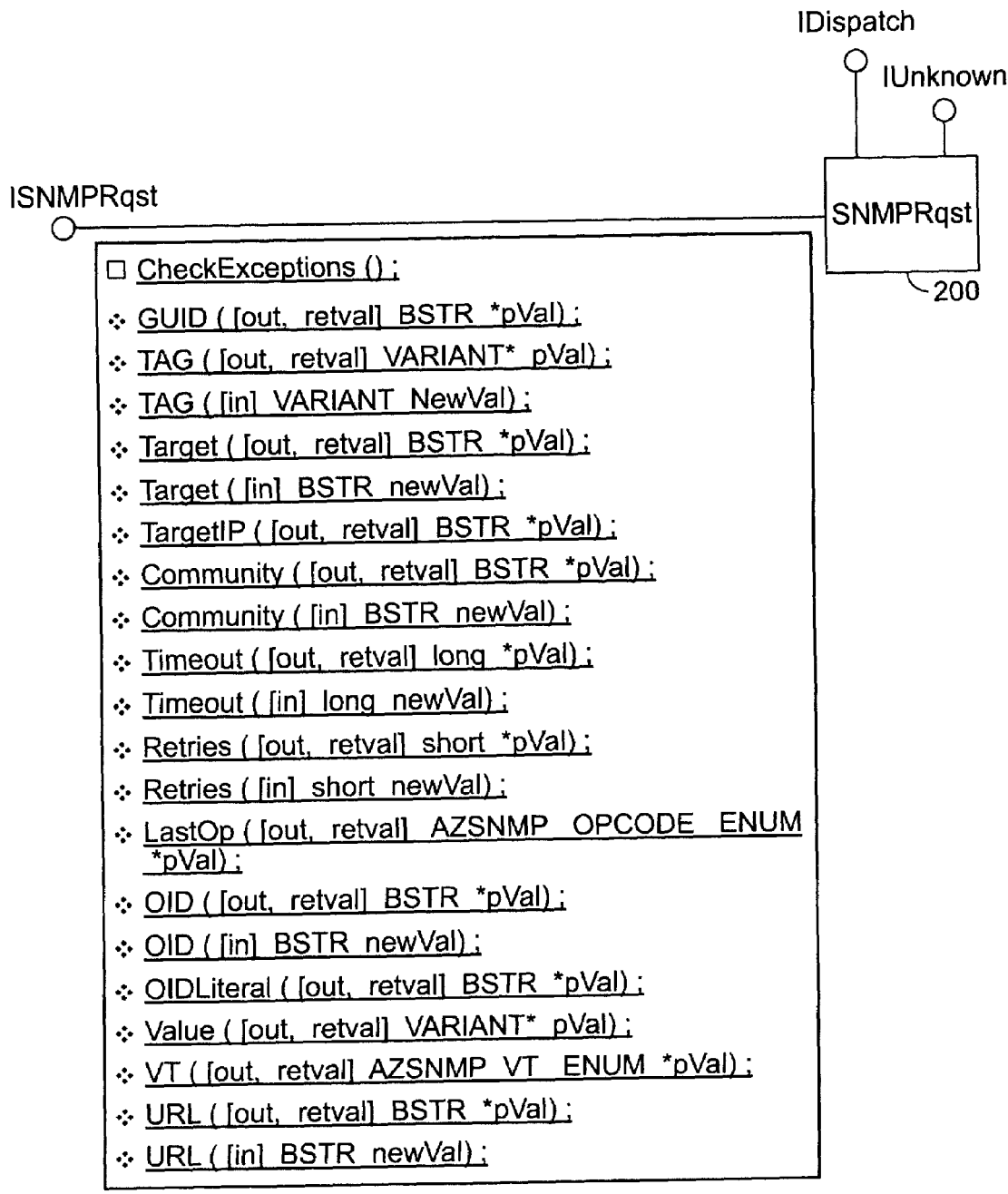
FIG. 2. illustrates a request object used in connection with a preferred embodiment of the present invention.

With reference to FIG. 2, the interface definition for a request object 200 (i.e., SNMPRqst Object) is illustrated. Within the discovery agent framework, all devices on the network are abstracted in the form of a COM object SNMPRqst (i.e., request object 200). Request object 200 is a representation of a device on the network (e.g., device 121) and encompasses communication with the device in the process of network discovery. All asynchronous operations (such as ICMP Ping, SNMP Get/GetNext, HTTP ReadURL, DNS ResolveName) addressed to the device and scheduled through the worker thread pool (as discussed in more detail with reference to FIG. 4) are represented by request object 200. This same request object 200 is returned through event procedures defined on the SNMPMgrAsync object (discussed with reference to FIG. 3). Properties and methods exposed by request object 200 allow for the defining of parameters of the requested operation and retrieving of the operation results. Through the event procedures Value, VT, and LastOp properties, together with the CheckExceptions method, result values and the resulting status of the requested operation are provided upon return of request object 200. The following provides a detailed description of the methods and properties exposed by request object 200.

HRESULT GUID([out, retval] BSTR *pVal);
Property GUID: Returns the GUID (i.e., globally unique identifier) of the request instance. Every instance of the request object 200 receives its own GUID, which allows for distinguishing among the requests returned through the event methods on the SNMPMgrAsync object (described with reference to FIG. 4).
HRESULT TAG([out, retval] VARIANT* pVal);
HRESULT TAG([in] VARIANT NewVal);
Property TAG: Sets/returns a TAG on the request object 200. A TAG is defined as a VARIANT data type and, as such, may represent a single value, and array of values, or an arbitrary COM object including an object representing a collection of other objects. As the TAG "travels" through the system together with the request object 200, it is used to store some information related to the processing of a particular request. For example, per-object save area exposed to the scripts is stored in the TAG property of the corresponding request object 200. The destructor function of the request object 200 frees memory associated with the TAG property to avoid "memory leaks".

The following group of properties assist in associating an abstract request object 200 with a specific device on the network and to define the general communication parameters that should be used in operations addressed to this device.
HRESULT Target([out, retval] BSTR *pVal);
HRESULT Target([in] BSTR newVal);
Property Target: Sets/returns the name or address of the request target, i.e., the device. The value of this property associates the request object 200 with the corresponding device on the network. This property accepts the target address in the form of dotted decimal notation or as a name. In the latter case, the name is resolved to the IP address using the name resolution mechanism available on the host.
HRESULT TargetIP([out, retval] BSTR *pVal);
Property TargetIP: Returns the IP address of a device associated with the current request in the dotted decimal notation. This property is used only if the target property was set using the name.
HRESULT Community([out, retval] BSTR *pVal);
HRESULT Community([in] BSTR newVal);
Property Community: Sets/returns the SNMP Community Name that should be used in SNMP operations associated with the particular request.
HRESULT Timeout([out, retval] long *pVal);
HRESULT Timeout([in] long newVal);
Property Timeout: Sets/returns the TCP/IP timeout that should be used in ICMP/SNMP/HTTP operations associated with the particular request.
HRESULT Retries([out, retval] short *pVal);
HRESULT Retries([in] short newVal);
Property Retries: Sets/returns TCP/IP retry count that should be used in ICMP/SNMP/HTTP operations associated with the particular request.

The following two properties are specific to SNMP communication with the target device.
HRESULT OID([out, retval] BSTR *pVal);
HRESULT OID([in] BSTR newVal);
Property OID: Sets/returns the OID (Object Identifier) for the next/last operation in the dotted numeric format. SNMP parlance relies on OIDs to identify data elements that are the subject of interest.
HRESULT OIDLiteral([out, retval] BSTR *pVal);
Property OIDLiteral: Returns the current OID associated with the request in the string (literal) format.

The following property is specific to HTTP communication with the target device.
HRESULT URL([out, retval] BSTR *pVal);
HRESULT URL([in] BSTR newVal);
Property URL: Sets/returns the URL (Universal Resource Locator) for the next/last HTTP operation. Within HTTP parlance, URLs are being used to identify data elements that are subject of interest.

The following properties and method allow for analyzing the status and retrieving results of the operations performed on the target device in accordance with the request.
HRESULT LastOp([out, retval] AZSNMP_OPCODE_ENUM *pVal);
Property LastOp: Returns enumerator defining the last requested/completed operation.
HRESULT Value([out, retval] VARIANT* pVal);
Property Value: Returns the value retrieved from the device.
HRESULT VT([out, retval] AZSNMP_VT_ENUM* pVal);
Property VT: Returns the SNMP type of the current value.
HRESULT CheckExceptions( );
Method CheckExceptions: Raises an error condition if errors were encountered during the operation over the request. If an error is encountered during the processing of the request, the raising of an error condition is delayed until the request is passed back through one of the event procedures to the processing framework, given that raising an error condition while the request is in the worker thread pool does not make sense.

Figure 3:
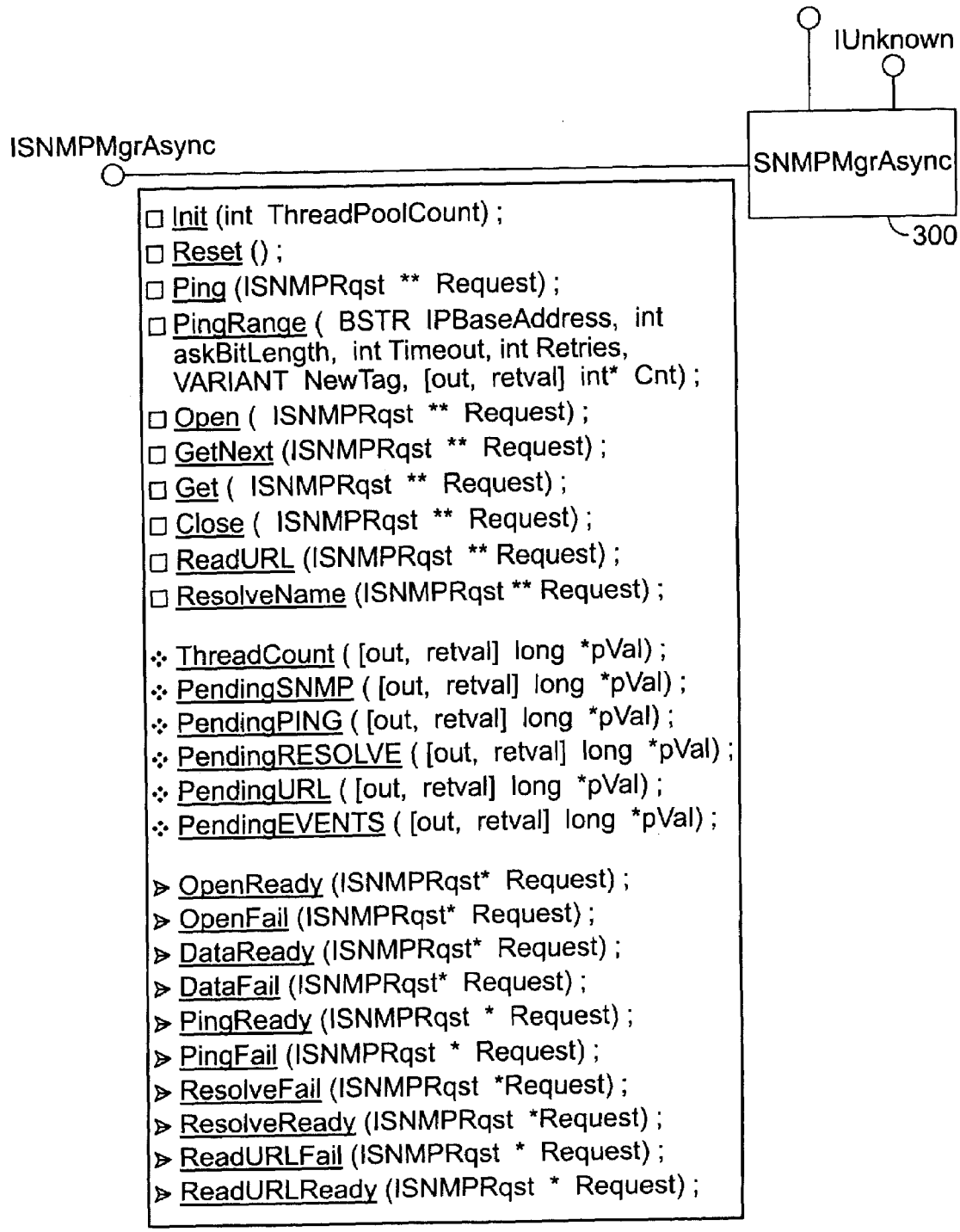
FIG. 3 illustrates a manager object used in connection with a preferred embodiment of the present invention.

With reference to FIG. 3, the interface definition for the manager object 300 (i.e., SNMPMgrAsync object) is illustrated. Manager object 300 is an internal object that encapsulates the worker thread pool. The manager object 300 exposes properties, methods, and events. The properties of the manager object 300 provide for querying the internal status of the object including the status of the queue. Methods are used to request various operations including initialization/termination and processing of various requests. The event interface defined on the manager object 300 allows for communicating back to the COM container the results of requested operations.

In the preferred embodiment, the manager object 300 is a Component Object Model (COM) object that provides an easy Automation interface into a pool of worker threads that carry out individual discovery operations. As the manager object 300 fully complies with the Automation interface, it can be used with any Automation container (such as VISUAL BASIC, EXCEL VBA) to provide fully asynchronous access to the parallel operations carried out by the threads in the worker thread pool. This allows the discovery agent, in the preferred embodiment, to be implemented in MICROSOFT's VISUAL BASIC without the typical loss of performance as compared to Visual C++.

The manager object 300 exposes the following methods.
HRESULT Init([defaultvalue(128)] int ThreadPoolCount);
Method Init: Prepares the manager object 300 for processing requests by first resetting the current thread pool (if one was initialized) and then allocating the requested number of threads for the worker thread pool.
HRESULT Reset( );
Method Reset: De-initializes manager object 300 and releases the thread pool. At the same time, all the pending requests in the request and result queues (see FIG. 4) are purged.
HRESULT Open(ISNMPRqst ** Request);

Method Open: Connects the request object 200 (FIG. 2) with the target IP address using SNMP protocol. As part of the connect procedure, access rights based upon the stored Community string are verified.

HRESULT Close(ISNMPRqst ** Request);
Method Close: Disconnects the request object 200 (FIG. 2) from the current target.

HRESULT Get(ISNMPRqst ** Request);
Method Get: Performs SNMP Get operation at current OID for the request that was previously connected to the target IP address using SNMP protocol. The result obtained result is stored as the Value property of the request object 200.

HRESULT GetNext(ISNMPRqst ** Request);
Method Get: Performs SNMP GetNext operation at current OID for the request that was previously connected to the target IP address using SNMP protocol. The result obtained is stored as the Value property of the request object 200.

HRESULT ResolveName(ISNMPRqst ** Request);
Method ResolveName: Performs DNS name lookup for the IP address of the corresponding request object 200.

HRESULT Ping(ISNMPRqst ** Request);
Method Ping: Performs ICMP Ping for the IP address of the corresponding request object 200 to verify the presence or absence of a device at the end-point.

HRESULT PingRange(BSTR IPBaseAddress,
 [defaultvalue(24)] int MaskBitLength,
 [defaultvalue(50)] int Timeout,
 [defaultvalue(2)] int Retries,
 [in, optional] VARIANT NewTAG,
 [out, retval] int* Cnt);
Method PingRange: Generates ICMP Ping Requests for every valid IP address in the specified subnet.

HRESULT ReadURL(ISNMPRqst ** Request);
Method ReadURL: Performs HTTP Read operation at the current URL for the request object 200.

The manager object 300 exposes properties that provide information regarding internal queues and worker thread pool status.

HRESULT PendingSNMP([out, retval] long *pVal);
Property PendingSNMP: Returns the number of pending SNMP requests (Open, Get, and GetNext).

HRESULT PendingPING([out, retval] long *pVal);
Property PendingPING: Returns the number of pending ICMP Ping.

HRESULT PendingRESOLVE([out, retval] long *pVal);
Property PendingRESOLVE: Returns the number of pending DNS Resolve requests.

HRESULT PendingURL([out, retval] long *pVal);
Property PendingURL: Returns the number of pending HTTP Read requests.

HRESULT PendingEVENTS([out, retval] long *pVal);
Property PendingEVENTS: Returns the number of outstanding event notifications, i.e., the total number of requests in the result queue (shown in FIG. 4).

HRESULT ThreadCount([out, retval] long *pVal);
Property ThreadCount: Returns the number of threads in the worker thread pool. If the pool is not initialized, the returned number would be 0.

In addition to methods and properties, the manager object 300 exposes an event interface. The event interface defined on the manager object 300 allows for communicating back to the COM container results of requested operations.

HRESULT OpenReady(ISNMPRqst* Request);
OpenReady event indicates that the SNMP Open operation on a particular request has completed successfully.

HRESULT OpenFail(ISNMPRqst* Request);
OpenFail event indicates that the SNMP Open operation on a particular request has failed.

HRESULT DataReady(ISNMPRqst* Request);
DataReady event indicates that SNMP Get or GetNext operation on a particular request has completed successfully.

HRESULT DataFail(ISNMPRqst* Request);
DataFail event indicates that SNMP Get or GetNext operation on a particular request has failed.

HRESULT PingReady(ISNMPRqst * Request);
PingReady event indicates that ICMP Ping operation on a particular request has completed successfully.

HRESULT PingFail(ISNMPRqst * Request);
PingFail event indicates that ICMP Ping operation on a particular request has failed.

HRESULT ResolveReady(ISNMPRqst *Request);
ResolveReady event indicates that DNS Resolve operation on a particular request has completed successfully.

HRESULT ResolveFail(ISNMPRqst *Request);
ResolveFail event indicates that DNS Resolve operation on a particular request has failed.

HRESULT ReadURLReady(ISNMPRqst * Request);
ReadURLReady event indicates that HTTP Get operation on a particular request has completed successfully.

HRESULT ReadURLFail(ISNMPRqst * Request);
ReadURLFail event indicates that HTTP Get operation on a particular request has failed.

Figure 4:
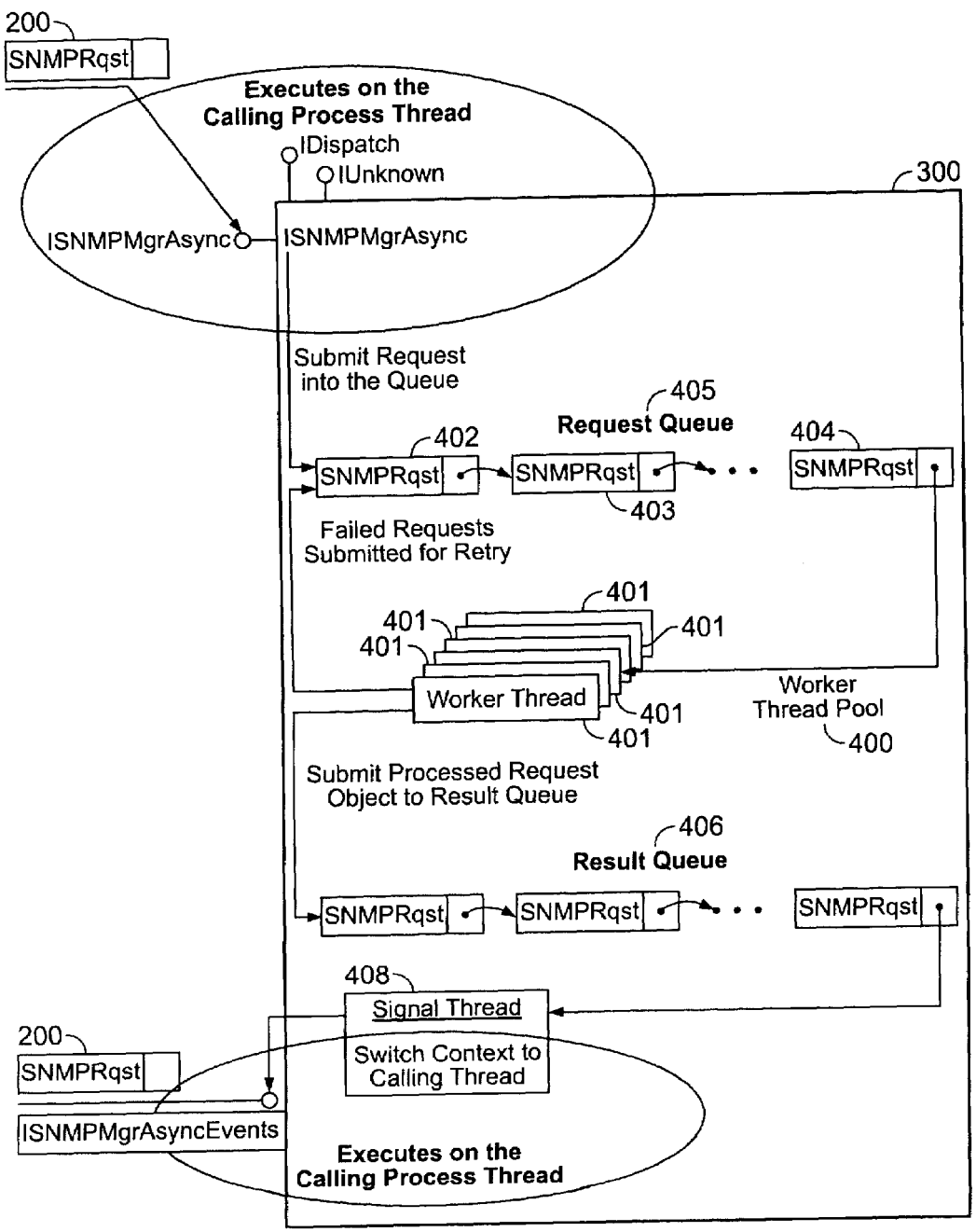
FIG. 4 illustrates the details of the operation of the manager object illustrated in FIG. 3 in accordance with a preferred embodiment of the present invention.

With reference to FIG. 4, the details of the internal operation of manager object 300 is illustrated. Manager object 300 encapsulates the worker thread pool 400 and implements asynchronous processing of requests, such as requests 402, 403 and 404. Most COM containers, and specifically COM Automation containers, implement a simplified threading model, which is not compatible with the fully asynchronous processing that is used to achieve significant improvement in discovery speed in accordance with the present invention. Implementing a free-threaded container for the manager object 300, which would be capable of processing asynchronous events, would not allow for extending the discovery process with custom scripts, as the scripting environment is based upon COM Automation. The manager object 300 implementation should, in the preferred embodiment, provide fully asynchronous processing to speed up discovery and semi-synchronous event notification to remain compatible with the COM Automation model.

To achieve this, manager object 300 implements, internally, two queues, a request queue 405 and a result queue 406, which allows for separation and coordination of synchronous and asynchronous operations.

Processing of properties is performed synchronously on the thread of the calling routine. Similarly, preprocessing and validation of the requests, e.g., requests 402, 403, 404, are also performed synchronously on the thread of the calling routine. If a request fails validation, the corresponding method call returns an error code and rejects the request. If a request passes validation, the method routine posts the request into the request queue 405 and returns control to the calling thread.

Free threads in the worker thread pool 400 wait on the request queue 405 and, when available, pop requests from the request queue 405 for asynchronous processing. If some communication error condition is raised during the processing of a request and the retry count, specified in the request, is not yet exhausted, the corresponding worker thread 401 posts this request back to the request queue 405 for another attempt. If the retry count is exhausted, the failure conditions are stored in the request object 200 and the request is marked as "failed". If a request is successfully processed, the results are stored in the request object 200 and the request is marked as "succeeded". Processed requests, whether successful or failed, are posted into the result queue 406.

Signal thread 408 pops processed requests from the result queue 406, analyzes their status and requested operation, and posts them to the original calling thread, which invoked the corresponding method on the manager object 300, through the appropriate event procedure. To protect the calling thread from overruns, the signal thread 408 switches context to the original calling thread context prior to posting the event. The switching context synchronizes the signal thread 408 with the calling thread for the period of posting the event back to the calling thread, thus providing for the COM Automation-compatible mechanism for posting back asynchronous events.

Figure 5:
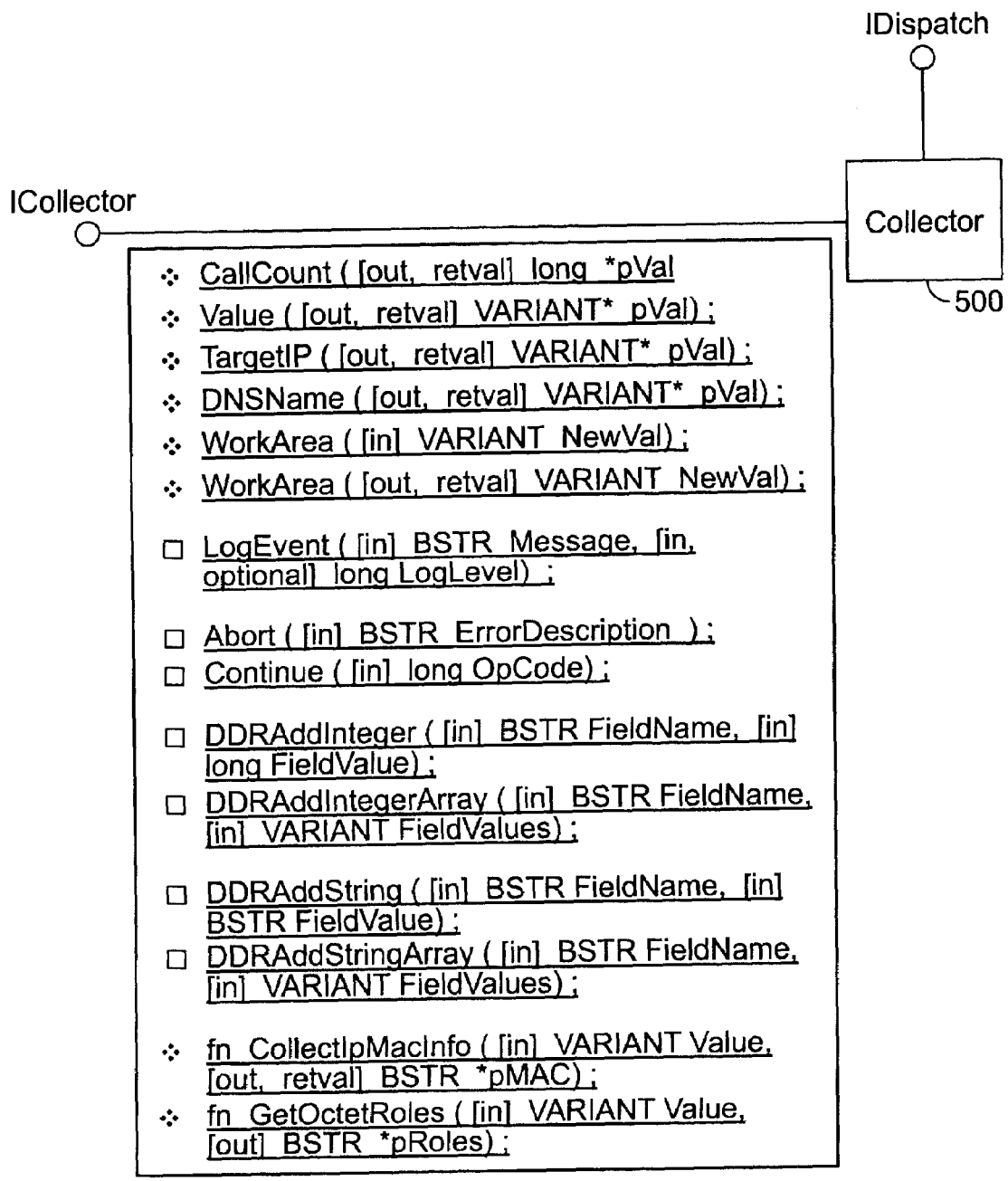
FIG. 5 illustrates a collector object used in connection with a preferred embodiment of the present invention.

With reference to FIG. 5, the interface definition for the collector object 500 is illustrated. To simplify writing custom discovery extension scripts, the discovery agent framework exposes to the scripts to collector object 500. Collector object 500 abstracts the intricacies of the internal operation of the framework, hides the complexity of the asynchronous processing of the requests, and provides scripts with a simple interface that allows for the writing of extension scripts in the traditional linear fashion (i.e., as if all the script steps are implemented in a synchronous step-by-step manner). Similarly, the collector object 500 insulates scripts from the intricacies of the output data format (whether XML or some other custom format), thereby providing the scripts with a simple mechanism for posting back collected information. Discovery information collected from the custom extension scripts through the collector object 500 is formatted by the discovery agent framework using the formatting plug-in (e.g., XML or SMS plug-ins) before it is serialized to the media.

The collector object 500 is an extension of the request object 200. Every collector object 500 when passed to the script has an instance of the underlying request object 200. Some of the properties of the collector object 500 are simply a direct path through to the underlying request object 200; the flow control methods of the collector object 500 are, to a large extent, mapped to the appropriate methods of the manager object 300, which controls the worker thread pool 400. Thus, the collector object 500 serves as "glue" between the various components of the discovery agent framework, which enables it to present a unified, consistent interface to the scripts, which define the main body of work performed by the discovery agent.

The following two properties assist scripts in maintaining their environment.

HRESULT WorkArea([out, retval] VARIANT* pVal);
HRESULT WorkArea ([in] VARIANT NewVal);
Property WorkArea: Sets/returns a Variant preserved from step-to-step, allowing the script to save data while executing. A WorkArea is defined as a VARIANT data type and, as such, may represent a single value, an array of values, or an arbitrary COM object, including an object representing collection of other objects. The WorkArea property of the collector object 500 is stored as a component in the TAG property of the underlying request object 200. As the TAG "travels" through the system together with the request object 200, it is preserved between the invocations of the same script on the same request, thus allowing for preserving the script environment between the invocations. Preserving the script environment is the mechanism through which the discovery agent framework represents the route of the request (and associated network device) processed through the system as linear and synchronous to the scripts.

HRESULT CallCount([out, retval] int* pVal);
Read-only property CallCount: The value of this property is reset by the framework to "1" on the first entry into the script for a particular request (and associated network device), thus allowing the script to perform some initialization if needed. If the script is iterative by its nature, the framework increments the value of the CallCount property on every invocation. To protect itself from errant scripts, the framework imposes a hard limit of 500 iterations through any script for a particular network device.

The following five properties are directly mapped to the corresponding properties of the underlying request object 200.

HRESULT TargetIP([out, retval] BSTR *pVal);
Property TargetIP: Returns the IP address as a string in a dotted decimal notation of the underlying device (associated through the request object 200).
HRESULT DNSName([out, retval] BSTR *pVal);
Property DNSName: Returns FQDN of the underlying device (associated through the request object 200).
HRESULT OID([out, retval] BSTR *pVal);
HRESULT OID([in] BSTR newVal);
Property OID: Sets/returns OID for the next/last operation in the dotted numeric format. SNMP parlance relies on OIDs to identify data elements that are the subject of interest.
HRESULT OIDLiteral([out, retval] BSTR *pVal);
Property OIDLiteral: Returns current OID associated with the request in the string (literal) format.
HRESULT URL([out, retval] BSTR *pVal);
HRESULT URL([in] BSTR newVal);
Property URL: Sets/returns URL for the next/last HTTP operation. Within HTTP parlance, URLs are used to identify data elements that are the subject of interest.
HRESULT Value([out, retval] VARLANT* pVal);
Read-only property Value: This property is mapped directly to the Value property of the underlying request object 200. The value of this property is reset by manager object 300 whenever a corresponding SNMPRqst (request object 200) enters the worker thread pool. At the completion of the requested operation the value of the Value property is set to reflect the data retrieved from the network device in response to the submitted request.

The following method simplifies error and status reporting from the scripts:

HRESULT LogEvent(BSTR Message, [defaultvalue(0)] int * LogLevel);
Method LogEvent: Writes a message to a log file. The optional parameter LogLevel is used to highlight the log file when viewed through the interface (see discussion referring to FIG. 11):
Normal (0)—no highlight;
Red (1)—message highlighted in red;
Yellow (2)—message highlighted in yellow;
Blue (3)—message highlighted in blue.

Following are the methods that allow scripts to control the flow of the request processing:

HRESULT Abort([in, defaultvalue("")] BSTR ErrorDescription);
Method Abort: Aborts execution of the script with the error message defined by the parameter ErrorDescription written to the log. The associated request object 200 is destroyed; all accumulated discovery information for the associated device is discarded.

HRESULT Continue([in, defaultvalue(0)] int * OpCode);
Method Continue: Through the parameter OpCode, informs the framework script control what to do next with regard to processing the current request; the default value is OpDone. The parameter OpCode may take the following values:

OpAbort (−1)—Same as the Abort method except that no error description will be written to the log file.

OpDone (0)—Informs the framework that the current script completed its processing. If this is the last script defined for the current device architecture, the framework generates the discovery record based upon the information reported by the scripts.

OpGet (1)—Informs the framework that the script has successfully performed a step and now requires some additional information to be retrieved from the device using the SNMP Get mechanism. The OID for the required data must be provided via the OID property.

OpGetNext (2)—Informs the framework that the script has successfully performed a step and now requires some additional information to be retrieved from the device using SNMP GetNext mechanism. The search for the next SNMP data element will start from the OID of the last performed SNMP operation for the current device.

OpResolveName (3)—Informs the framework that the script has successfully performed a step and now requires FQDN for the device, which should be obtained through the DNS reverse lookup.

OpGetURL (4)—Informs the framework that the script has successfully performed a step and now requires that some additional information be retrieved from the device using HTTP Get mechanism; the URL of the required HTTP document must be specified in the URL property.

The following methods assist scripts in reporting discovered data to the framework:

HRESULT DDRAddInteger([in] BSTR FieldName, [in] int * FieldValue As Long);
Method DDRAddInteger: Adds the named integer value to the list of discovered values collected for the current device.

HRESULT DDRAddIntegerArray([in] BSTR FieldName, [in] VARIANT FieldValues);
Method DDRAddIntegerArray: Adds the named array of integer values to the list of discovered values collected for the current device.

HRESULT DDRAddString ([in] BSTR FieldName, [in] BSTR FieldValues);
Method DDRAddString: Adds the named string value to the list of discovered values collected for the current device.

HRESULT DDRAddStringArray([in] BSTR FieldName, [in] VARIANT FieldValues);
Method DDRAddInteger: Adds the named array of string values to the list of discovered values collected for the current device.

Pseudo-properties, fn_CollectIpMacInfo and fn_GetOctetRoles, are utility functions exposed as properties.

HRESULT fn_CollectIpMacInfo([in] VARIANT VarValue);
Property fn_CollectIpMacInfo: Converts SNMP-compatible bit representation of the MAC address, retrieved by SNMP Get\GetNext requests for the OID "interfaces.ifTable.ifEntry.ifPhysAddress" to MAC address in the format of "00-00-00-00-00-00".

HRESULT fn_GetOctetRoles(VarValue)

Property fn_GetOctetRoles: Converts SNMP-compatible bit representation of the device roles to a comma separated list of roles in the string representation. For example, ("Workstation", "Server", "SQL Server").

FIG. 6 illustrates a sample script that retrieves the NetBIOS name of the device using the collector object 500. The scripts can be written to return any information accessible through SNMP or HTTP protocols (e.g., IP addresses, MAC addresses, list of installed programs, etc.) in accordance with the present invention.

The interface used in connection with the present invention is described with reference to FIGS. 7-11. The interface allows for the definition of all parameters defining discovery, including subnet information, identification of various architectures, scheduling of discovery runs, and level of logging, by way of example. Interactive or autonomous execution of the discovery process may also be invoked through the interface. Custom scripts, which are tightly integrated with the discovery process and govern the discovery subtasks performed in accordance with the invention, are managed through the interface. Changing existing scripts and/or creating and imbedding into the discovery process new scripts does not require changes, recompilation, or link-editing of any executables—all the modifications are carried out through the interface. The functions performed by interface may run locally (on the machine where the inventive system is installed and running) or remotely over the network.

The interface organizes discovery management information in a tree structure, where each of the top-level nodes corresponds to broad categories of control information presented and managed through interface. The tree structure is presented in the left pane of the interface; the right pane displays detailed information about the node selected in the left pane and allows for entering and/or changing this information. A significant amount of user interaction with the interface is performed through a context-sensitive set of menus, which are invoked by the right-clicking mechanism of a mouse. Many of the user interface components provide tips and short descriptions, which are invoked when the cursor hovers over a corresponding interface element.

Figure 7:
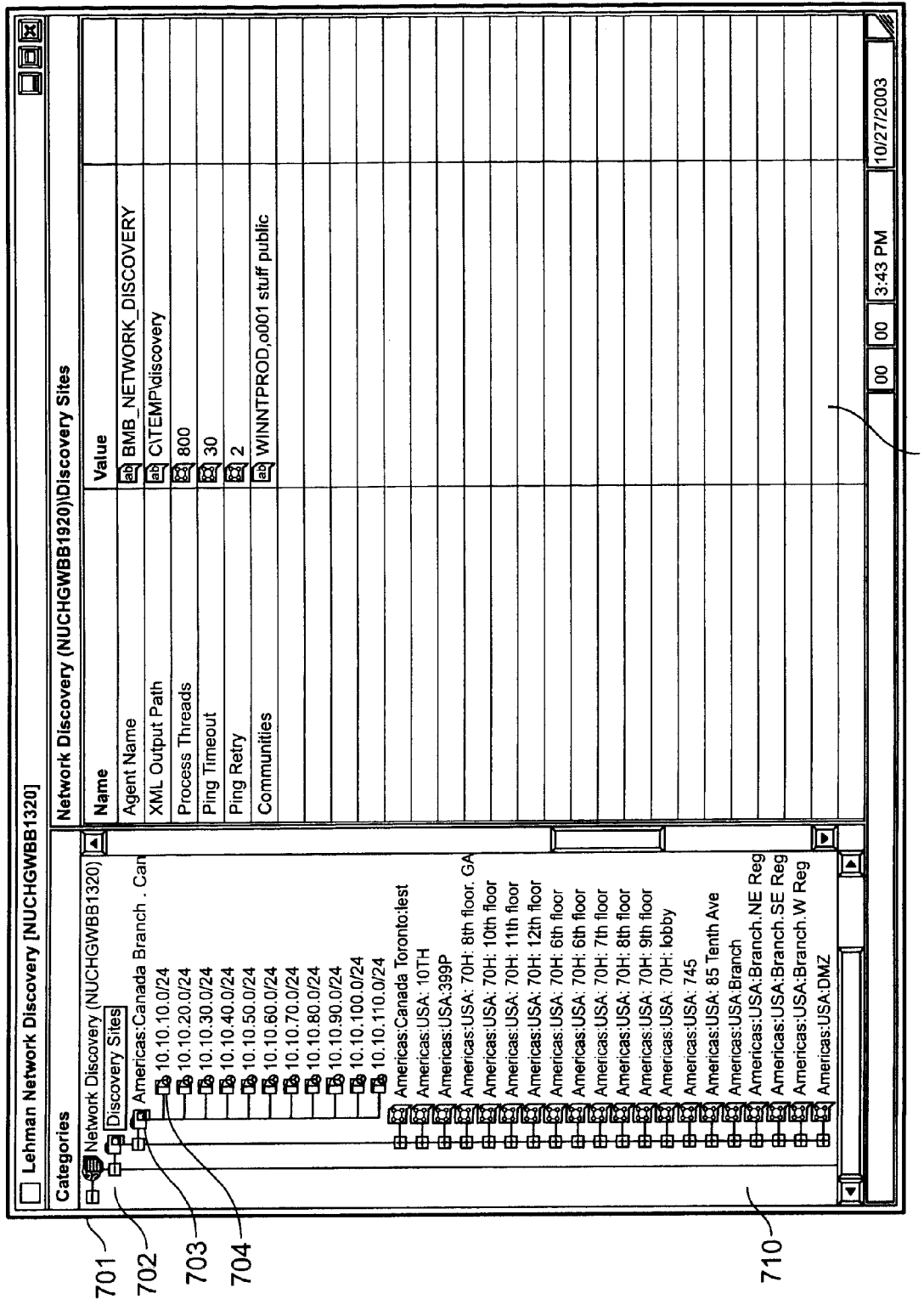

Referring to FIG. 7, this figure illustrates the interface component through which information regarding discovery sites and subnets is entered and managed. At the lowest level, information about any TCP/IP network is comprised of the list of individual subnets integrated into the network. In the majority of the circumstances, particularly with respect to typical corporate networks that span multiple locations, the subnets within the network are integrated into sites. The interface follows the same paradigm, in the preferred embodiment. The root node, network discovery node 701, indicates the server to which the interface is connected. Right-clicking on the network discovery node 701 opens a menu through which an administrator may save/restore and export/import all the information pertinent to the discovery process established for the network. The first node, discovery sites node 702, aggregates information regarding the TCP/IP network that is the subject of discovery. When the discovery sites node 702 is selected in the hierarchy (left pane 710), in the right pane 720, global discovery settings, such as those that follow, can be reviewed and set:

Agent Name: The name that will appear as the discovery agent name in the generated discovery records.

XML Output Path: The path to the directory where generated discovery records will be stored.

Process Threads: The size of the discovery thread pool.

Ping Timeout: Timeout (in milliseconds) that will apply to all ICMP, SNMP, and HTTP requests.

Ping Retry: Retry count that will apply to all ICMP, SNMP, and HTTP requests.

Communities: A list of SNMP community names that should be tried in order when submitting SNMP queries to the devices on the network.

Underneath the discovery sites node 702 are individual nodes, each of which represent a single discovery site. These individual nodes, e.g., site nodes 703, may be assigned arbitrary names depending on the specific network structure. At the site level, the administrator may overwrite global settings for the Ping Timeout, Ping Retry, and Communities settings. Each site node 703 aggregates definitions of the individual subnets, e.g., subnet node 704, representing the site. Again, inherited values for the Ping Timeout, Ping Retry, and Communities can be overwritten on the subnet level (i.e., subnet node 704) as well.

Right-clicking on the discovery sites node 702 opens a context-sensitive menu of the operations through which an administrator may save/restore and export/import discovery sites information, as well as create a new discovery site. Right-clicking on a site node 703 opens a context-sensitive menu, which allows for adding a new subnet to the site, adding a corresponding site to one or more discovery schedules, disabling (i.e., excluding from discovery scan) or enabling the site, or completely deleting the site. Right-clicking on a subnet node 704 allows for disabling (i.e., excluding from discovery scan) or enabling the subnet, or completely deleting the subnet.

Figure 8:
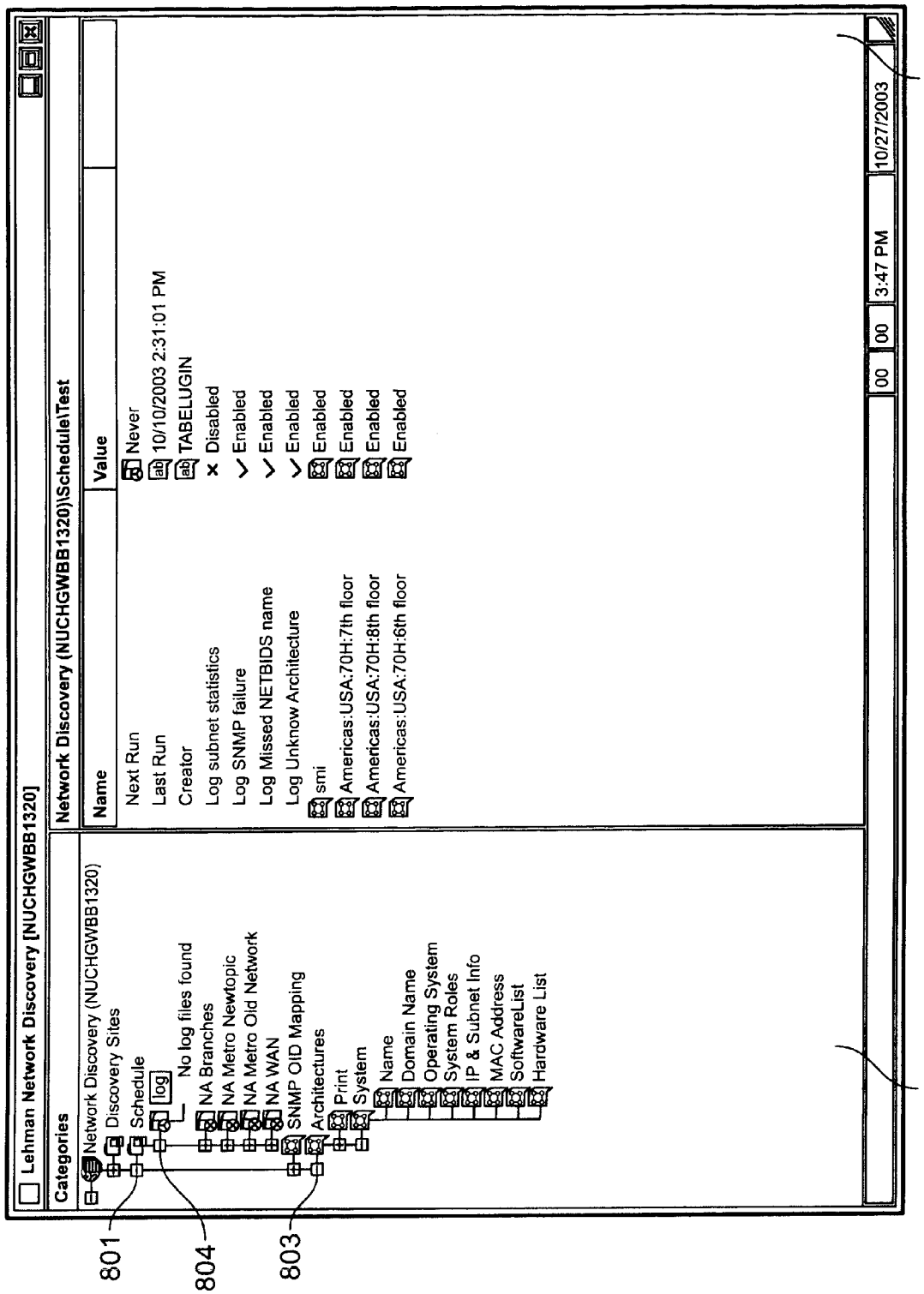

FIG. 8 illustrates the scheduling interface, which allows for the creation and management of new schedules for unattended execution of the inventive discovery process. Referring to FIG. 8, the schedule node 801 groups together management information regarding various discovery task schedules established for the TCP/IP network, defined under the discovery sites node 702. Right-clicking on the schedule node 801 opens a context-sensitive menu of the operations through which an administrator may save/restore and export/import schedule information, as well as create a new schedule. Each individually-named schedule node 804 under the schedule node 801 represents one instance of a scheduled unattended discovery run. Individual schedules may be named in accordance with the local policies or preferences. When an individual schedule is selected in the left pane 810 of the interface, the right pane 820 changes to reflect details and attributes of this particular schedule. The first three lines in the right pane 820 (Next Run, Last Run, and Creator) describe basic scheduling attributes of the schedule and identify the creator of the schedule.

The next four lines shown in right pane 820 identify available logging options and their status:

Log subnet statistics: If this logging level is enabled, the discovery agent will report statistics for every subnet that was included in the corresponding discovery sweep. Subnet statistics indicate the number of individual addresses in the subnet, the number of addresses that responded to ICMP Ping request, and number of positively identified network devices (the latter gives the number of discovery records generated for this subnet).

Log SNMP failures: If this logging level is enabled, the discovery agent will report all active IP addresses, for which SNMP request failed after cycling through all defined community names.

Log Missed NETBIOS names: If this logging level is enabled, the discovery agent will report all active devices, for which SNMP request succeeded, but the agent was not able to obtain a device name neither through SNMP, nor through reverse DNS lookup.

Log Unknown Architecture: If this logging level is enabled, the discovery agent will report all positively identified devices, for which agent was not able to complete the discovery process as it was not able to identify the architecture of the device.

Double-clicking on the corresponding logging level will toggle the status of the corresponding log.

The following lines in the right pane 820 identify all discovery sites (see discovery sites node 703 of FIG. 7), associated with this schedule. Right-clicking on the site name will bring up the context sensitive menu through which the status of the site in the schedule may be toggled (enabled/disabled) or the corresponding site may be excluded from the schedule.

Figure 9:
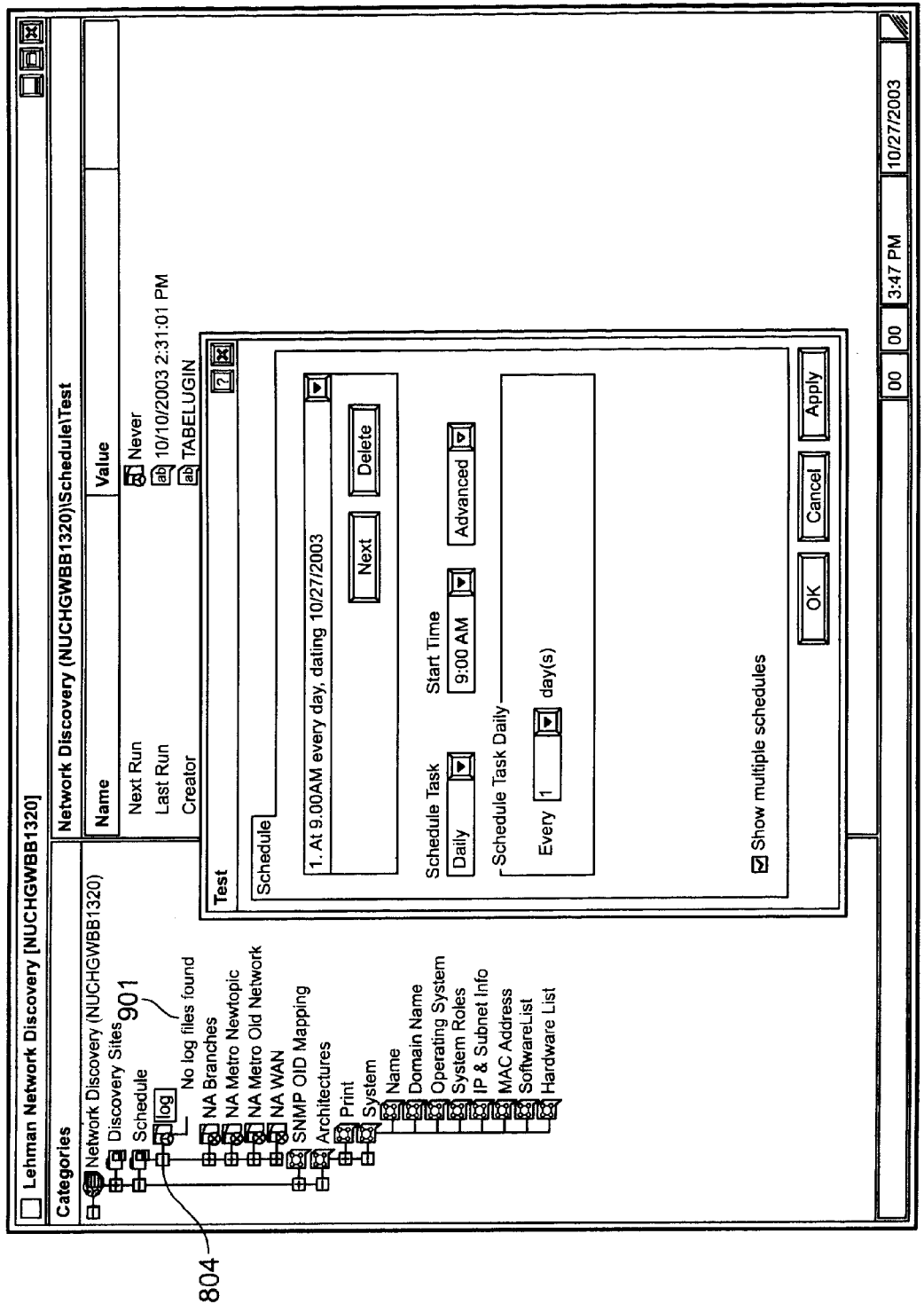

In the preferred embodiment, individual task scheduling is implemented through a Windows internal task scheduling mechanism (Windows Scheduler service), illustrated in FIG. 9. The detailed task scheduling interface, implemented in Windows Scheduler, is invoked through the interface of the present invention. Right-clicking on a schedule node (e.g., schedule node 804) opens a context-sensitive menu, which allows the user to add a new site to the schedule, invoke a detailed scheduling interface, invoke immediate execution of the discovery agent for this schedule, toggle the status of the schedule (enabled/disabled), or clear all accumulated log files.

Every unattended or manually invoked execution of the schedule results in a log file. The level of detail presented in the log file depends on the status of the individual logging levels as discussed above. At minimum, the time and duration of the discovery run, together with the number of IP addresses scanned and number of devices discovered, will be logged, in the preferred embodiment. Each log creates a log node 901 underneath the corresponding schedule node 804. (In the illustrated embodiment, no log files are present). Double-clicking the log node 901 will open the log in the external viewer; right-clicking the log node allows the administrator to delete an individual log file.

Figure 10:
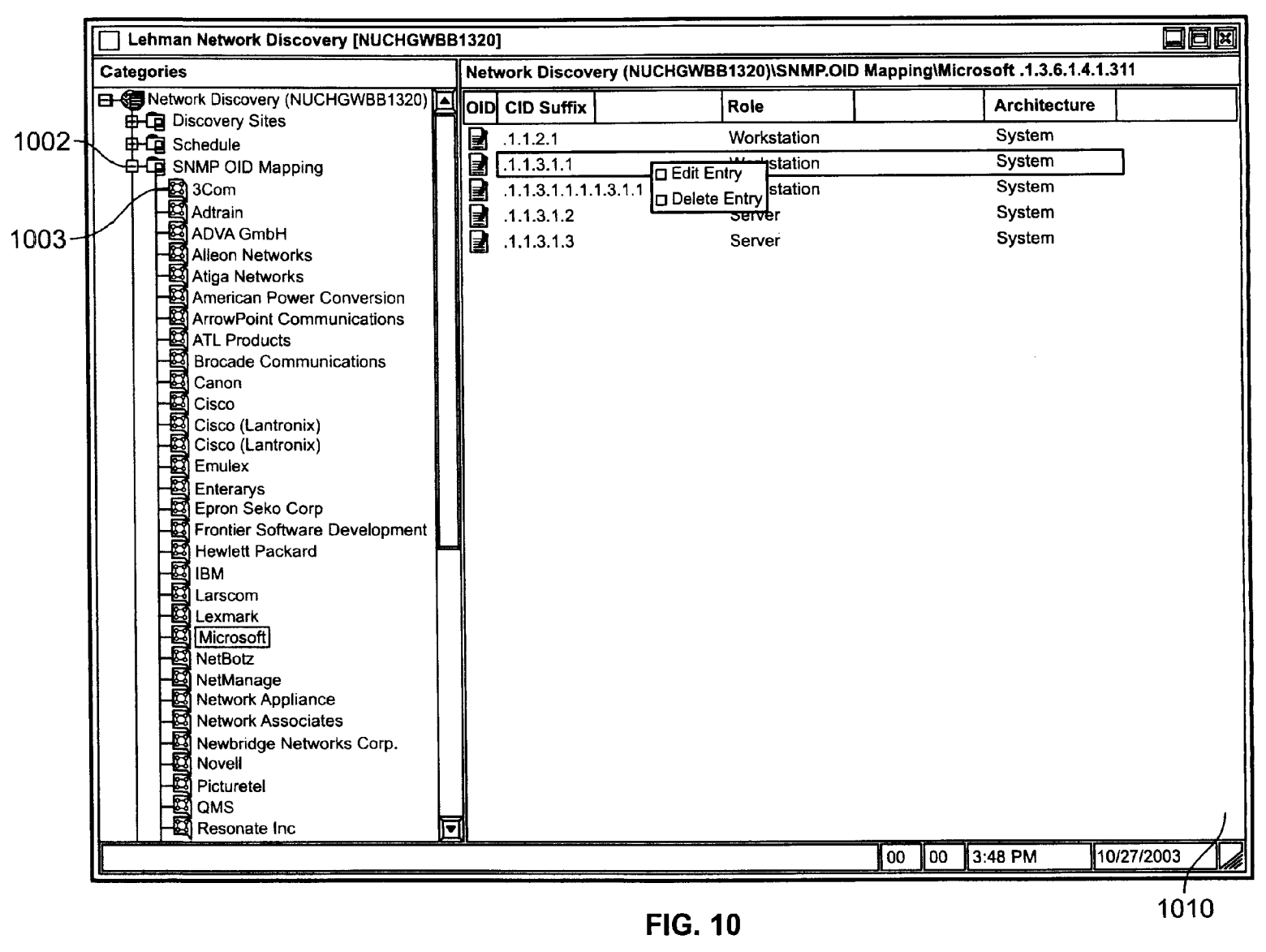

Referring to FIG. 10, this interface allows for management of associations between system OIDs (SNMP Object Identifiers) of discovered devices and corresponding vendors and architectures. Different network devices may require (and are capable of reporting) various pieces of information for proper discovery. An inflexible approach is inappropriate for the multitude of devices presented on contemporary networks. Thus, it is important to identify a category (i.e., architecture) of the discovered device to customize subsequent queries directed to this device for positive identification (i.e., discovery) of the device. In accordance with a preferred embodiment of the present invention, SNMP is used to identify the device architecture. To identify the architecture, standardized "*Network Management Private Enterprise Codes*", centrally managed by the Internet Assigned Numbers Authority (IANA), and augmented with individual device codes obtained from corresponding vendors, are used. This information is presented under the SNMP OID mapping node 1002, which groups together mappings between the SNMP System OID and corresponding vendors/architectures defined for the subject TCP/IP network. Right-clicking on the SNMP OID mapping node 1002 opens a context-sensitive menu of operations through which an administrator may save/restore and export/import OID mapping information, as well as create a new top-level (enterprise) mapping. Underneath the SNMP OID mapping node 1002 are the enterprise nodes 1003 corresponding to individual manufacturers of the network-aware equipment. The enterprise nodes 1003 correspond to the individual enterprises as defined in "*Network*

*Management Private Enterprise Codes*". To speed up the discovery process, the entire "*Network Management Private Enterprise Codes*" document is not imported in the preferred embodiment, but only those entries that correspond to devices commonly found on the network at issue. Missing entries can be easily identified through the review of the unknown architecture log, controlled by the Log Unknown Architecture logging level (see FIG. 8).

As shown in right-hand pane 1010 of FIG. 10, each Enterprise Number OID, corresponding to one of the children (i.e., enterprise nodes 1003) of the SNMP OID mapping node 1002, is augmented with a suffix that allows for the identification of the category (i.e., architecture) of the corresponding device and, thus, directs the discovery agent to the appropriate set of discovery scripts for the device.

Right-clicking an enterprise node 1003 invokes a context-sensitive menu, through which an administrator may create entries for individual device architectures for this enterprise. Clicking on the enterprise node 1003 brings up in the right pane 1010 the list of architectures defined for this enterprise. Each of the OID mappings into architectures can be individually edited or deleted through the context-sensitive menu. As the architecture of the device is directly related to the execution of custom scripts, defined for this architecture, while editing the mapping entry, the interface limits the choice of architectures to those defined under the architectures node 803 (see FIG. 8).

Referring to FIG. 11, the script management interface allows for managing custom extension scripts. The flexible and adaptable nature of the present invention is based upon custom discovery scripts that extend the core discovery framework. At execution time, these scripts become an integral part of the discovery agent. The operations requested by the scripts are scheduled to the worker thread pool in the same manner (and with the same efficiency) as the base discovery operations implemented directly in the discovery agent. The interface allows for managing these scripts. The top-level architectures node 803 groups together all individual architectures defined in the interface for a particular network. Right-clicking on the architectures node 803 opens a context-sensitive menu of the operations through which an administrator may save/restore and export/import all custom scripts, as well as create a new architecture node. Architectures may be given arbitrary names; however, it is a good practice to give architectures meaningful names (like PC, Printer, Switch etc.). Individual architecture choices defined under the architectures node 803 limit the choice of device architectures available for OID mapping.

Each node under the architectures node 803 groups together individual scripts, which extend the discovery process for the corresponding architecture. Right-clicking on the architectures node 803 opens a context-sensitive menu of the operations through which an administrator may add a new script node 1101 to the architecture, toggle the status of the architecture (enable/disable), as well as completely delete the architecture node. If a particular architecture is disabled, discovery records for the network devices associated with this category will not be generated.

Each script is an individual component and may perform arbitrary discovery functions. The interface between the scripts and the framework is provided through the collector object 500 (see FIG. 5). Preferably, the scripts are named in accordance with the discovery function(s) embodied in the corresponding script. Individual scripts under the architectures node 803 are scheduled for execution in the order they are listed under the architecture. Right-clicking on the script node 1101 opens a context-sensitive menu of the operations through which an administrator may rename a script node, move the script node up or down relative to siblings, toggle the status of the script (enable/disable), as well as completely delete corresponding script node. Selecting (clicking on) the script node 1101 brings the script content into the right pane 1110, where it may be edited. In the preferred embodiment, extension scripts should comply with MS VBScript specification, as they are processed by the MS Scripting object. The interface allows for editing of scripts by providing parsing and color-coding of the entered scripts. The script editing pane also supports cut and paste operations. If the focus changes in the left pane 1120, the framework brings up the confirmation dialog, through which the administrator is given choices as to whether to save changes, discard changes, or return back to editing the script.

Figure 12A:
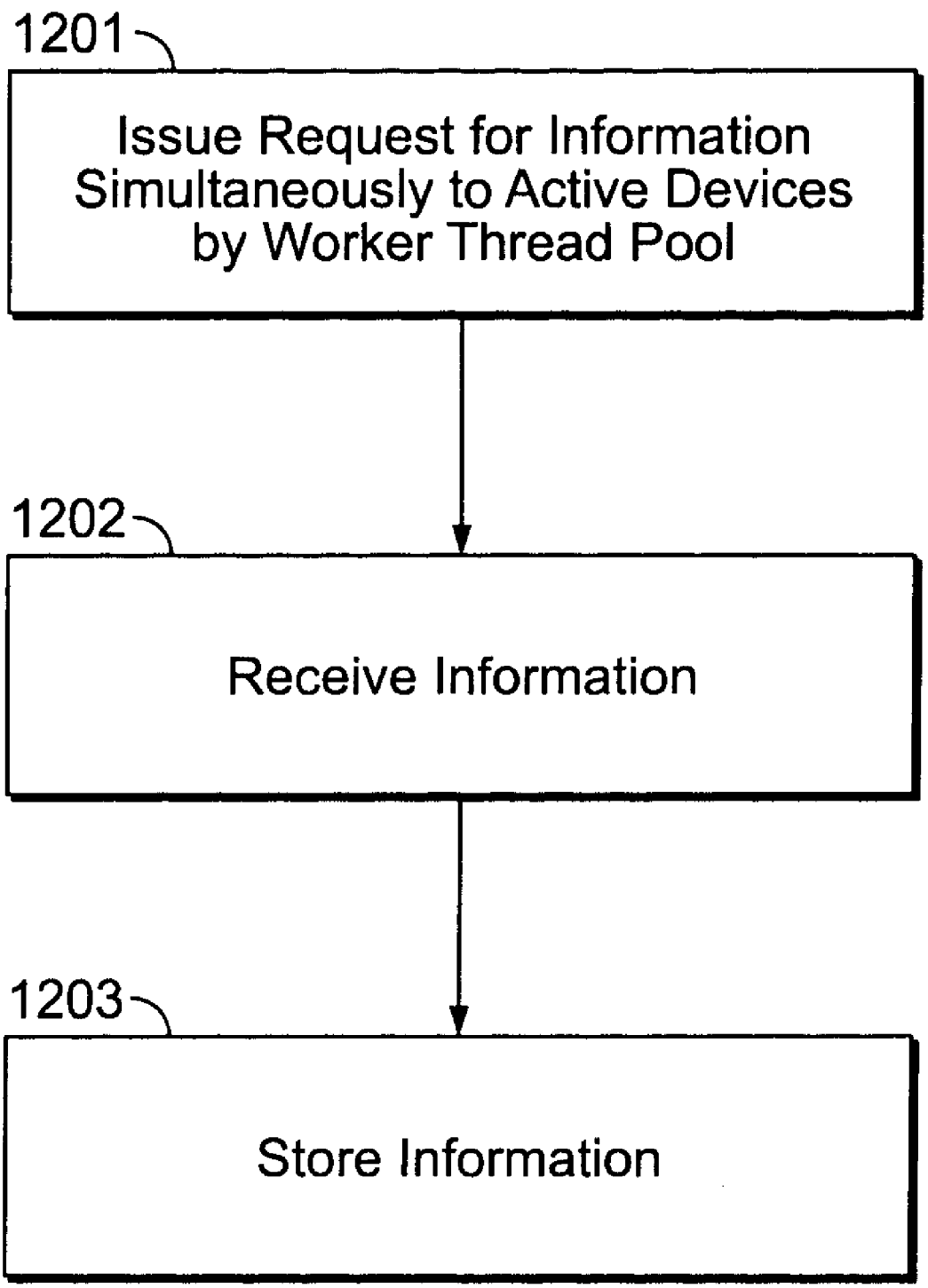
FIGS. 12A and 12B are flow charts illustrating preferred embodiments of methods of the present invention.
Figure 12B:
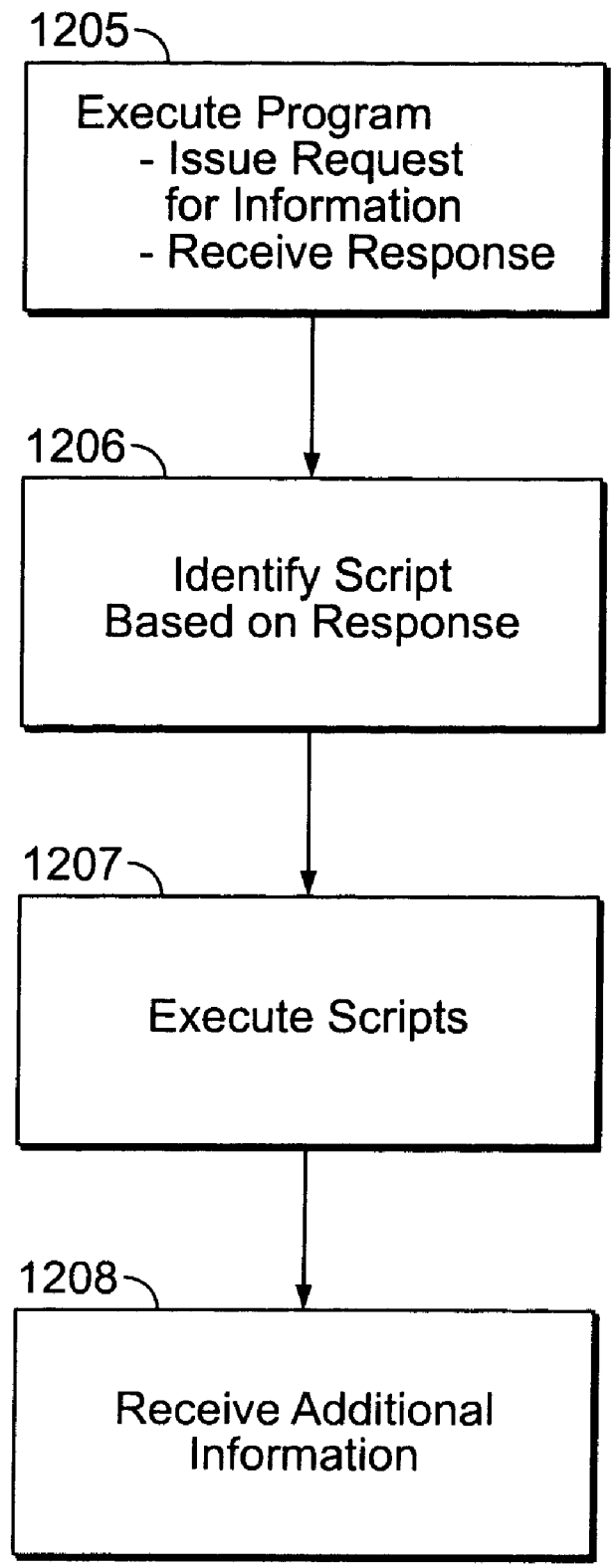

With reference to FIGS. 12A and 12B, preferred embodiments of the methods of the present invention are illustrated. With reference to FIG. 12A, a method for identifying a plurality of active devices on a network is illustrated. In step 1201, a request for information is simultaneously issued to the plurality of active devices, by each of a plurality of worker threads. The information includes an indication of a presence of the active device on the network, wherein all of the plurality of worker threads are capable of performing identical functions in response to the request for information. In response to the request, the information is received in step 1202. The received information is stored in step 1203.

With reference to FIG. 12B, a method for identifying a plurality of active devices on a network is illustrated. In step 1205, a program is executed, which includes (1) issuing to each of the active devices one or more first requests for information comprising an indication of a presence of the device on the network and a device architecture; and (2) receiving in response to the first requests a response. Based on the device architecture indicated in the response, one or more scripts that request additional information about the device are identified in step 1206. The scripts are customizable and executed outside the program. The scripts are executed, in step 1207, and the additional information received, in step 1208.

We claim:

1. A system, comprising:
a manager object executing a plurality of worker threads in parallel, a request queue, and a result queue;
a plurality of requests objects;
a computer configured to process the manger object and the plurality of request objects, the manger object configured to receive each of the plurality of request objects and to organize each of the request objects in the request queue;
a plurality of active devices on a network in communication with the computer, each of the plurality of request objects representative of the active devices and a request for an indication of a presences of the one of the active devices on the network;
the managed object further configured to distribute each of the plurality of request objects in the request queue to one or more of the plurality of worker threads,
each of the plurality of worker threads configured to process each of the plurality of request objects in the request queue, to perform at least identical discovery functions on the plurality of active devices in response to the request for an indication, and to send each of the plurality of request objects to the manger object,
the manager object further configured to receive a response for each of the plurality of request objects from the one or more of the plurality of worker threads after the response to the request for an indication has been received, and to organize in the result queue the response of each of the plurality of request objects; and a storage device coupled to the computer, the storage device configured to store the response received for each of the plurality of the request objects.

2. A method, comprising:

communicating with a plurality of active devices on a network;

providing a manger object executing a plurality of worker threads in parallel, a request queue and a result queue;

receiving in the request queue a plurality of request objects, each of the plurality of request objects representative of one of the active devices and a request for an indication of a presence of the one of the active devices on the network;

distributing each of the plurality of request objects in the request queue to one or more of the plurality of worker threads, each of the plurality of worker threads configured to process each of the plurality of request objects in the request queue, to perform at least identical discovery functions on the plurality of active devices in response to the request for an indication, and to send each of the plurality of request objects to the manager object;

receiving a response for each of the plurality of request objects from the one or more of the plurality of worker threads after the response to the request for an indication has been received;

organizing in the result queue the response of each of the plurality of request objects; and storing in a storage device the response received for each of the plurality of request objects.

3. A computer program product including a computer readable medium having stored thereon computer executable instruction that, when executed on a computer, configure the computer to perform a method comprising the steps of:

communicating with a plurality of active devices on a network;

providing a manger object executing a plurality of worker threads in parallel, a request queue and a result queue;

receiving in the request queue a plurality of request objects, each of the plurality of request objects representative of one of the active devices and a request for an indication of a presence of the one of the active devices on the network;

distributing each of the plurality of request objects in the request queue to one or more of the plurality of worker threads, each of the plurality of worker threads configured to process each of the plurality of request objects in the request queue, to perform at least identical discovery functions on the plurality of active devices in response to the request for an indication, and to send each of the plurality of request objects to the manager object;

receiving a response for each of the plurality of request objects from the one or more of the plurality of worker threads after the response to the request for an indication has been received; and organizing in the result queue the response of each of the plurality of request objects; and storing in a storage device the response received for each of the plurality of request objects.

* * * * *

UNITED STATES PATENT AND TRADEMARK OFFICE
CERTIFICATE OF CORRECTION

PATENT NO. : 7,640,546 B2
APPLICATION NO. : 10/759901
DATED : December 29, 2009
INVENTOR(S) : Zarenin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this

Ninth Day of November, 2010

David J. Kappos
*Director of the United States Patent and Trademark Office*